United States Patent [19]

Mueller et al.

[11] 4,336,139
[45] Jun. 22, 1982

[54] VACUUM PAN RAISING AND LOWERING SYSTEM

[75] Inventors: Max A. Mueller, Centerville; Dirk Vandertoolen, Salt Lake City; Gerald Minear, Centerville, all of Utah

[73] Assignee: Envirotech Corporation, Menlo Park, Calif.

[21] Appl. No.: 209,937

[22] Filed: Nov. 24, 1980

[51] Int. Cl.³ .............................................. B01D 33/04
[52] U.S. Cl. ...................................... 210/401; 210/406
[58] Field of Search ......................... 210/400, 401, 406

[56] References Cited
U.S. PATENT DOCUMENTS 3,497,063 2/1970 Hirs ..................................... 210/400
4,080,298 3/1978 Nordengren ......................... 210/406
4,233,157 11/1980 Miller ................................. 210/406

FOREIGN PATENT DOCUMENTS 783594 10/1979 South Africa .

Primary Examiner—Ivars C. Cintins
Attorney, Agent, or Firm—Robert E. Krebs; Thomas J. McNaughton

[57] ABSTRACT

A machine for filtering slurry includes a frame with two drums mounted to said frame for rotation and spaced apart from one another. An endless, perforated drainage belt is disposed around the two drums to define a substantially horizontal drainage surface on the top of the drainage belt. A vacuum pan is located below the drainage surface to apply vacuum to material on the drainage surface, and a raising and lowering system is coupled to the vacuum pan to selectively support the vacuum pan in sealing engagement with the drainage belt and to selectively lower the vacuum pan away from the drainage belt.

3 Claims, 3 Drawing Figures

VACUUM PAN RAISING AND LOWERING SYSTEM

BACKGROUND OF THE INVENTION

1. Field of the Invention

The present invention generally relates to an improved filtering system of the horizontal belt type for dehydrating slurries.

2. State of the Art

Conventional horizontal belt vacuum filters include two drums which are horizontally disposed and rotatable about their horizontal axes. The two drums are rotatably affixed to a frame. An endless drainage belt is disposed around the two drums to define a substantially horizontal drainage surface on the upper run of the belt between the lower edges of the two drums. The drainage belt is flexible so that as the drums are rotated the belt can continuously travel around the drums. The drainage belt is perforated so that liquid on the upper run can flow through the perforations. A drive means is coupled to one of the drums to cause it to rotate, thereby causing rotation of the drainage belt and the other drum. A continuous belt of filter media is disposed around the drainage belt to be carried by the upper run, and a plurality of rollers is located below the drums to carry the filter media.

Feed means is disposed above the horizontal drainage surface near one of the drums. The feed means introduces slurry atop the filter media on the horizontal drainage surface. A vacuum pan is disposed below the horizontal drainage surface to apply vacuum to the slurry thereon to dehydrate the slurry.

In practice it is often necessary to lower the vacuum pan away from the horizontal drainage surface for cleaning or repair. A patented system for lowering the vacuum pan is taught in U.S. Pat. No. 4,080,298.

In some conventional horizontal vacuum systems a worker has to crawl between the belts to gain access to the vacuum pan. Thus it is necessary for the space between the upper and lower runs of the belt to be large in such systems. Two conventional ways of enlarging the space between the runs are to either make the drums large or to utilize small spreader rollers beneath the drums to lower the lower belt run. There are significant disadvantages to either of these approaches. For example, if the drums are large, expensive machinery is required to drive the drums. If spreader rollers are utilized it is, of course, necessary for the belt to pass over the small rollers. Thus the belt is required to flex considerably thus contributing to rapid wear and deterioration.

OBJECTS OF THE INVENTION

An object of the present invention is to provide an improved vacuum pan raising and lowering system.

Another object is to provide a raising and lowering system which permits a worker easy access to the vacuum pan.

Another object is to permit the vacuum pan to be raised and lowered while maintaining it in an upright orientation.

Further objects and advantages of the present invention may be readily ascertained by reference to the following description and appended drawings, which are offered by way of illustration only and not in limitation of the invention, the scope of which is defined by the appended claims and equivalents.

DETAILED DESCRIPTION OF THE PREFERRED EMBODIMENT

Figure 1:
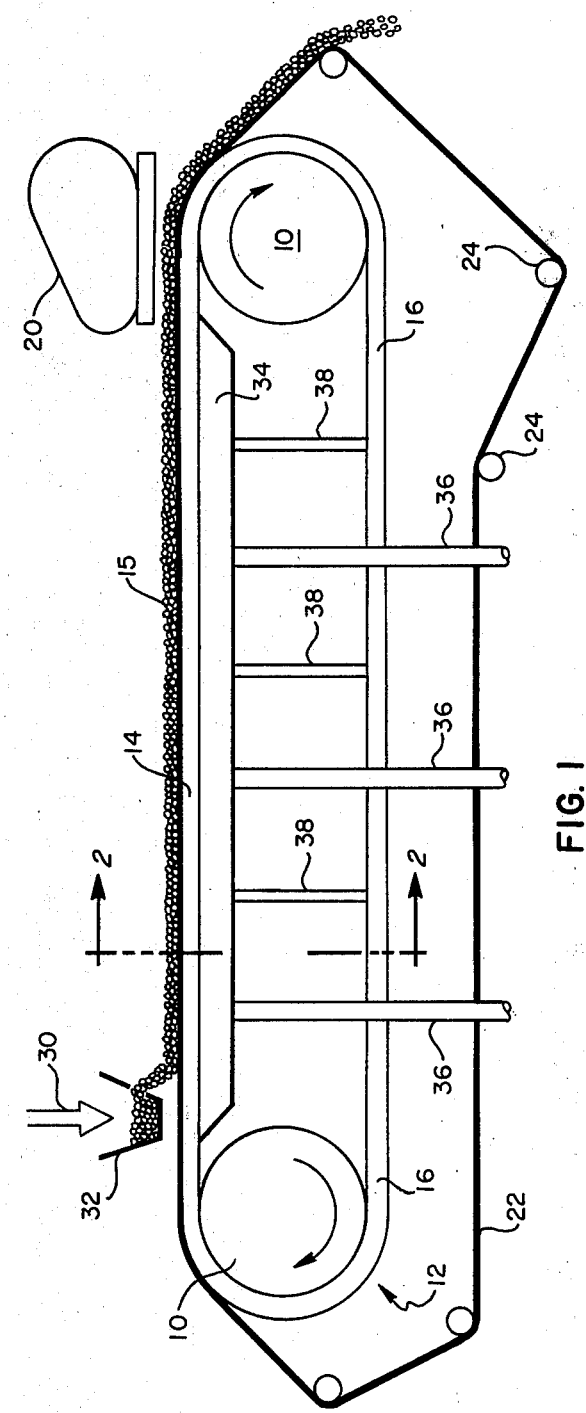
FIG. 1 is a schematic illustration of the present system.

With reference to FIG. 1, a horizontal belt vacuum filter is schematically illustrated. The horizontal belt vacuum filter includes two drums 10 which are horizontally disposed and rotatable about their horizontal axes. The two drums 10 are rotatably affixed to a frame which is not shown. An endless drainage belt 12 is disposed around the two drums 10 to define an upper run 14 forming a substantially horizontal drainage surface 15 between the upper edges of the two drums 10 and a lower run 16 between the lower edges of the two drums 10. The drainage belt 12 is flexible so that as the drums 10 are rotated the belt can continuously travel around the drums. Perforations are formed in the drainage belt 12 so that liquid on the upper run 14 can flow through the belt. A drive means 20 is coupled to one of the drums 10 to cause it to rotate, thereby causing rotation of the drainage belt 12 and the other drum 10. A continuous belt of filter media 22 is disposed around the drainage belt 12 to be carried by the upper run 14. A plurality of rollers 24 is located below the drums 10 to carry the filter media 22.

Feed means comprising a feed inlet 30 and a feed box 32 is disposed above the horizontal drainage surface of the upper run 14 near one of the drums 10. The feed inlet 30 and feed box 32 provide a means to introduce slurry atop the filter media 22 on the upper run 14. A vacuum pan 34 has an elongated channel configuration and is disposed below the upper run 14. A plurality of vacuum conduits 36 are coupled to the vacuum pan 34 and to a vacuum pump, now shown, to create a vacuum in the vacuum pan 34. The vacuum pan 34 is disposed in sealing relationship with the underside of the upper run 14 so that liquid flowing through the perforations in the upper run 14 then flows into the vacuum pan 34.

In operation the drive means 20 drives the drum 10 to rotate in a clockwise direction, thereby causing the drainage belt 12 to travel around the drums 10. Simultaneously, slurry is introduced into the feed inlet 30 to flow onto the filter media 22 located on top of the horizontal drainage surface of the upper run 14. Thus the slurry and the filter media 22 are carried with the drainage belt 12 as it moves. Vacuum is applied to the vacuum pan 34, thus drawing liquid from the slurry through the filter media 22, the perforations in the upper run 14, and then through the vacuum pan 34 and to collection.

During operation the vacuum pan 34 can become clogged with solids and require cleaning. Also the vacuum pan 34 can wear or become damaged and require adjustment or repair. When any of these things occurs it is necessary to release the vacuum pan 34 from engagement with the drainage belt 12 and move the vacuum pan to an accessible location. A vacuum pan raising and lowering system 38 is coupled to the vacuum pan 34 to support the pan and permit the pan to be moved.

Figure 2:
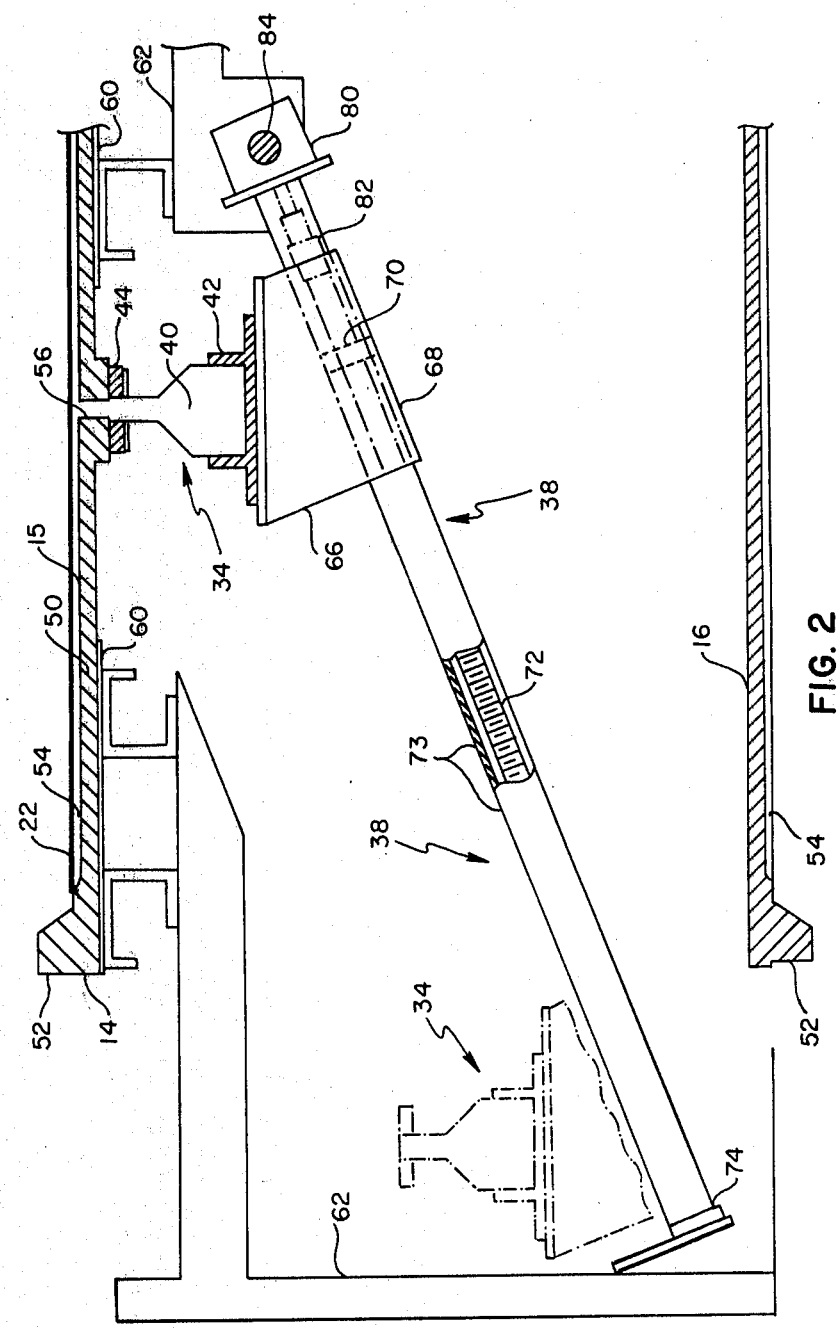
FIG. 2 is a cross-sectional illustration of the system in FIG. 1 taken along line 2—2.

According to FIG. 2, the vacuum pan 34 is shown by solid lines in the operating position and by phantom lines in the cleaning or repair position. The vacuum pan 34 comprises an elongated channel member 40 which has its lower part coupled to flanges 42 and its upper edges coupled to elongated friction reducing members 44.

As further shown in FIG. 2, the drainage belt 16 includes a center part 50 extending the width of the machine and upstanding flanges 52 located along each edge of the center part 50. Grooves 54 are formed in the surface of the center part 50 perpendicular to the flanges 52, and a plurality of perforations 56 are formed through the center part 50 to communicate with the grooves 54. The grooves 54 and the raised parts of the belt therebetween comprise the horizontal drainage surface 15. The upper run 14 is supported on plates 60 forming part of the frame 62.

Turning again to the vacuum pan 34, the channel 40 is affixed to flanges 42 which in turn are affixed to a plurality of support members 66. Each support member 66 is a flat plate of triangular configuration having a flat, horizontal plate affixed to its upper edge. The support members 66 are coupled by bolts and nuts, not shown, to the flanges 42 to permit lateral adjustment of the vacuum pan 34. The support members 66 are coupled at their lower ends to base members 68 which are substantially rectangular conduits. A support nut 70 is affixed to the lower side of each base member 68 to cooperate with each lowering screw 72.

A plurality of channels 73 are located with one adjacent each lowering screw 72 and disposed inside each base member 68. Each channel 73 is shaped generally in the form of an inverted letter U so that the upper side of the base member 68 rests on the closed part of the U and can slide thereon. The lower end of each channel 73 is coupled to a bearing 74, and the upper end of each channel is coupled a drive gear 80 thus orienting the channel 73 in an inclined position. In normal practice the channel 73 is inclined between twenty and forty degrees from the horizontal.

Each lowering screw 72 comprises a threaded rod which is rotatably coupled at its lower end to the frame 62 by bearing 74. The upper end of the lowering screw 72 is rotatably coupled to a drive gear 80 by means of coupling 82. The drive gear 80 is located near the center of the upper run 14, and the bearing 74 is normally located outside the space between the upper and lower runs so that the vacuum pan 34 can be lowered to a position outside the space between the upper run 14 and the lower run 16. The drive gear 80 is a means for converting rotational motion in one axis to rotational motion in another axis. The drive gear 80 is connected to a rod 84 which is capable of rotation to drive the drive gear 80, which in turn causes the lowering screw 72 to rotate.

Figure 3:
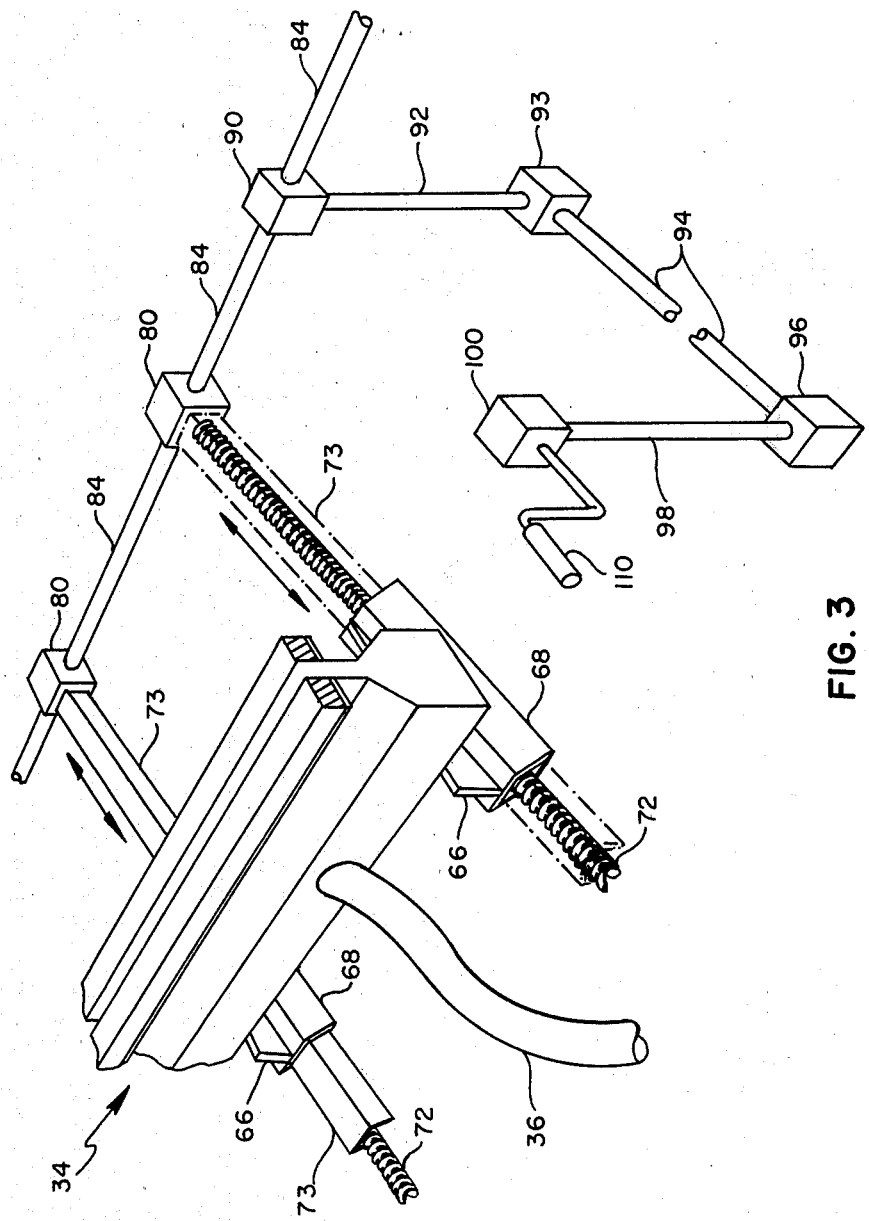
FIG. 3 is an isometric illustration of a cross section of the present system.

Turning to FIG. 3, the figure illustrates part of the system including means to cause lowering screws 72 to rotate. It should be appreciated that there are a plurality of drive gears 80 and lowering screws 72 utilized with a single vacuum pan 34. The number of lowering screws 72 which are utilized is dependent upon the length of the vacuum pan 34; however, in practice two screws 72 are the minimum necessary to adequately maintain the pan 34 at the same elevation throughout its length. It has been found that the lowering screws should be spaced apart no more than about 10–15 feet from one another so that the vacuum pan 34 can be raised and lowered at the same rate along its entire length without being deformed.

With reference still to FIG. 3, there is shown the rod 84 rotatably coupled to the left part of a right angle gear 90. Another rod 84 is coupled to the right part of the gear 90, and this rod 84 is in turn coupled to a plurality of drive gears 80 located to the right of gear 90, which gears are not shown. The right angle gear 90 is a means to convert rotational motion in one axis to rotational motion in another axis. A vertical rod 92 is coupled to the lower part of the right angle gear 90, and the vertical rod 92 in turn is rotatably coupled to a right angle gear 90 which is affixed to the frame 62, not shown, near the lower part of the filter. A rotatable, horizontal rod 94 has its right end rotatably coupled to a right angle gear 93, and the left end of the rod 94 is rotatably coupled to another right angle gear 96. The right angle gear 96 is affixed to the frame 62, and the gear 96 is in turn coupled to a vertical rod 98 which is in turn rotatably coupled to another right angle gear 100 mounted on the frame 62. The right angle gear 100 is rotatably coupled to a crank 110; however, alternatively a motor or the like can replace the crank. Thus it can be seen that when the crank 110 is manually rotated the rotational force is transferred through the combination of rods and right angle gears to the plurality of drive gears 80. The plurality of drive gears 80 in turn cause the lowering screws 72 to rotate, thereby moving the vacuum pan 34.

In operation, the drums 10 are driven to rotate while slurry is deposited on the filter media 22 located on the upper run 14. The vacuum pan 34 is disposed in abutting relationship with the underside of the upper run of the drainage belt 12 so that the friction-reducing members 44 engage the belt 12. Vacuum is applied to the vacuum pan 34 and thus to the slurry on the filter media 22 thereby to remove liquid from the slurry. Dehydrated slurry, known as filter cake, is removed from the right end of the belt and transferred to further treatment or disposal.

During filtering the vacuum pan 34 can become clogged with solids or require adjustment or replacement. For example, the friction-reducing members 44 wear during normal operation, and it is thus necessary to raise the vacuum pan 34 to insure a good seal with the drainage belt 16. The vacuum pan 34 can be raised in various ways such as by adding shims between the flanges 42 and the support members 66. Also, minor height adjustments can be accomplished by rotating the screws 72 to raise or lower the vacuum pan 34. When the vacuum pan 34 is raised or lowered in this way, it is also moved horizontally relative to the belt 12. to compensate for this horizontal movement and insure that the pan 34 is horizontally aligned with the perforations 56, the pan 34 can be horizontally adjusted with respect to the support members 66.

It should be appreciated that cleaning, replacement and adjustment of the vacuum pan 34 are all manual operations. That is, to accomplish these functions a person must have access to the vacuum pan 34. Thus, when it becomes necessary to repair, adjust or replace the vacuum pan 34, the operation of the filter is stopped by stopping the feed material introduced through the feed inlet 30 and shutting off the vacuum applied to the vacuum pan. Thereafter, the crank 110 is rotated thereby causing the lowering screws 72 to rotate. Thus the vacuum pan is lowered along the channels 73 until it is in a position as shown by phantom lines in FIG. 2.

The bearings 74 supporting the lower ends of the lowering screws 72 can be located substantially outside the space between the upper run 14 and the lower run 16. Thus when the vacuum pan 34 is lowered it can be moved to a position substantially outside the space between the upper run 14 and the lower run 16 thereby enabling a worker to have easy access to the vacuum pan 34 without requiring him or her to crawl beneath the upper run 14. It has been found that it is easier for a worker to work on the vacuum pan 34 when it is in position outside the space between the upper run 14 and the lower run 16, and it is believed to be safer for a worker to remain outside that space as opposed to inside.

In some systems the bearing 74 can be located near the edge of the lower run 16 so that the vacuum pan 34 can be lowered to a point near the edge of the lower run 16 and inside the space between the upper and lower runs. In a system of this type the pan 34 can be located near enough to the edge of the lower run 16 to permit a worker to remain outside the space between the upper and lower runs while working on the vacuum pan 34.

It should also be appreciated that the present system provides significant operating advantages with respect to conventional systems. In particular, since a worker has to crawl between the belts in many conventional systems, it is necessary for the upper and lower runs of the belt to be large in such systems. Two conventional ways of accomplishing tis are either to make the drums large or to utilize small spreader rollers beneath the drums to lower the lower belt run. There are significant disadvantages to either of these approaches. For example, if the drums are large, expensive machinery is required to drive the drums. If spreader rollers are utilized it is, of course, necessary for the belt to pass over the small rollers. Thus the flanges and the belt are required to flex considerably thus contributing to their rapid wear and deterioration. In contrast, according to the present system the upper run 14 and lower run 16 need not be spaced far apart and therefore the operating disadvantages of prior systems are significantly reduced or eliminated.

It should also be appreciated that the present system permits the vacuum pan 34 to be raised and lowered while being maintained in an upright position. This is important for a number of reasons. For example, precise sealing engagement must be maintained between the belt 14 and the friction reducing members 44. In the present system when the friction reducing members 44 have become worn, the vacuum pan 34 can be adjusted upward to maintain a good seal with the belt 14 by slightly rotating the screw 72. Moreover, when the friction reducing members 44 must be replaced, the vacuum pan 34 is upright when it is in the repair position, thereby permitting new friction reducing members 44 to be easily installed.

It should be appreciated that although the present system includes screws 72, alternate means of raising and lowering the vacuum pan 34 can be provided. For example, a hydraulic cylinder system or a motor driven pulley could be utilized.

We claim:

1. A machine for filtering slurry comprising:
    (a) a frame;
    (b) two drums mounted to said frame for rotation and spaced apart from one another;
    (c) an endless, perforated drainage belt entrained around said two drums to define a substantially horizontal drainage surface on the upper run of said drainage belt between said two drums;
    (d) means to drive said endless drainage belt;
    (e) a vacuum pan located below the drainage surface to apply vacuum to material on the drainage surface; and
    (f) raising and lowering means coupled to said vacuum pan to selectively raise said vacuum pan into sealing engagement with said drainage belt and to selectively lower said vacuum pan away from said drainage belt; said raising and lowering means including at least two channels mounted in parallel relationship to the frame under the upper run to extend downwardly away from the upper run, a drive screw rotatably mounted within each channel, means for selectively and synchronously rotating said screws, and means for operatively connecting the vacuum pan to both of said screws in a precise upright orientation adapted to cause the vacuum pan to form a seal along its length with the drainage belt when in its raised position, said connecting means including slide members that are slidably engaged upon said channels.

2. The filtering machine according to claim 1, wherein said two channels are inclined from the vertical, the upper ends thereof being near the drainage belt and the lower ends thereof being located laterally outwardly of the drainage belt to thereby facilitate access to the vacuum pan when in its lowered position.

3. The filter machine according to claim 1 wherein said means for operatively connecting the vacuum pan to the screws includes a nut threaded on each screw, said slide members being respectively connected to said nuts and each having an upper surface slidable along the upper surface of the associated channel, and means for mounting the vacuum pan to said slide members so that the vacuum pan is supported in said precise upright orientation.

* * * * *